(12) United States Patent
Czichy

(10) Patent No.: US 9,436,072 B2
(45) Date of Patent: Sep. 6, 2016

(54) METHOD FOR DETERMINING A PREDEFINABLE WAVE FORM OF A LAMP CURRENT FOR OPERATING A DISCHARGE LAMP OF A PROJECTION ARRANGEMENT, AND PROJECTION ARRANGEMENT

(71) Applicant: OSRAM GmbH, Munich (DE)

(72) Inventor: Marc Czichy, Berlin (DE)

(73) Assignee: OSRAM GMBH, Munich (DE)

( * ) Notice: Subject to any disclaimer, the term of this patent is extended or adjusted under 35 U.S.C. 154(b) by 193 days.

(21) Appl. No.: 14/474,202

(22) Filed: Sep. 1, 2014

(65) Prior Publication Data

US 2015/0077721 A1    Mar. 19, 2015

(30) Foreign Application Priority Data

Sep. 18, 2013    (EP) .................................... 13185019

(51) Int. Cl.
  *H05B 37/02*    (2006.01)
  *G03B 21/20*    (2006.01)
  *H04N 9/31*    (2006.01)
  (Continued)

(52) U.S. Cl.
  CPC ......... *G03B 21/2053* (2013.01); *H04N 9/3111* (2013.01); *H05B 41/2883* (2013.01); *H05B 41/3921* (2013.01); *G02B 26/008* (2013.01)

(58) Field of Classification Search
  CPC ............ H05B 41/3921; H04N 9/3155; Y02B 20/202
  USPC ........................................................ 315/291
  See application file for complete search history.

(56) References Cited

U.S. PATENT DOCUMENTS

2006/0050246 A1    3/2006    Moench et al.
2008/0246926 A1    10/2008    Deppe
(Continued)

FOREIGN PATENT DOCUMENTS

DE    102010039221 A1    2/2012
DE    102011089592 A1    6/2013
(Continued)

OTHER PUBLICATIONS

Tousain, R.; van Casteren, D: "Iterative learning control in a mass product: light on demand in DLP projection systems", Proceedings of the 2007 American Control Conference, New York City, 2007, pp. 5478-5483.
(Continued)

*Primary Examiner* — Don Le
(74) *Attorney, Agent, or Firm* — Viering, Jentschura & Partner mbB

(57) ABSTRACT

Various embodiments provide a method for determining a wave form of a lamp current for operating a discharge lamp of a projection arrangement having a color wheel and a ballast, such that a polarity of the electrodes is commutated in accordance with a commutation scheme of the wave form. The method involves providing a wave form having a commutation scheme and checking whether operation of the discharge lamp satisfies one criterion relating to a lifetime of the discharge lamp or a flicker amplitude of the projection arrangement. If the criterion checked is satisfied, checking whether operation of the discharge lamp satisfies the other of the two criteria is carried out. If at least these two criteria are satisfied, the wave form is stored in a memory of the projection arrangement and provided as the predefinable wave form at the ballast for the discharge lamp.

16 Claims, 8 Drawing Sheets

(51) Int. Cl.
  *H05B 41/288* (2006.01)
  *H05B 41/392* (2006.01)
  *G02B 26/00* (2006.01)

(56) References Cited

U.S. PATENT DOCUMENTS

| | | |
|---|---|---|
| 2010/0141906 A1 | 6/2010 | Deppe et al. |
| 2011/0140625 A1 | 6/2011 | Van Casteren |
| 2013/0134899 A1* | 5/2013 | Magg .................... H05B 37/02 315/291 |
| 2013/0169184 A1 | 7/2013 | Nakamura |
| 2014/0340656 A1 | 11/2014 | Mueller et al. |

| | | | |
|---|---|---|---|
| 2015/0331304 A1* | 11/2015 | Okamoto | ............. H04N 9/3155 353/85 |

FOREIGN PATENT DOCUMENTS

| | | |
|---|---|---|
| WO | 2008089846 A1 | 7/2008 |
| WO | 2010086191 A2 | 8/2010 |

OTHER PUBLICATIONS

European Search Report issued in corresponding EP 13185019 on May 9, 2014.

* cited by examiner

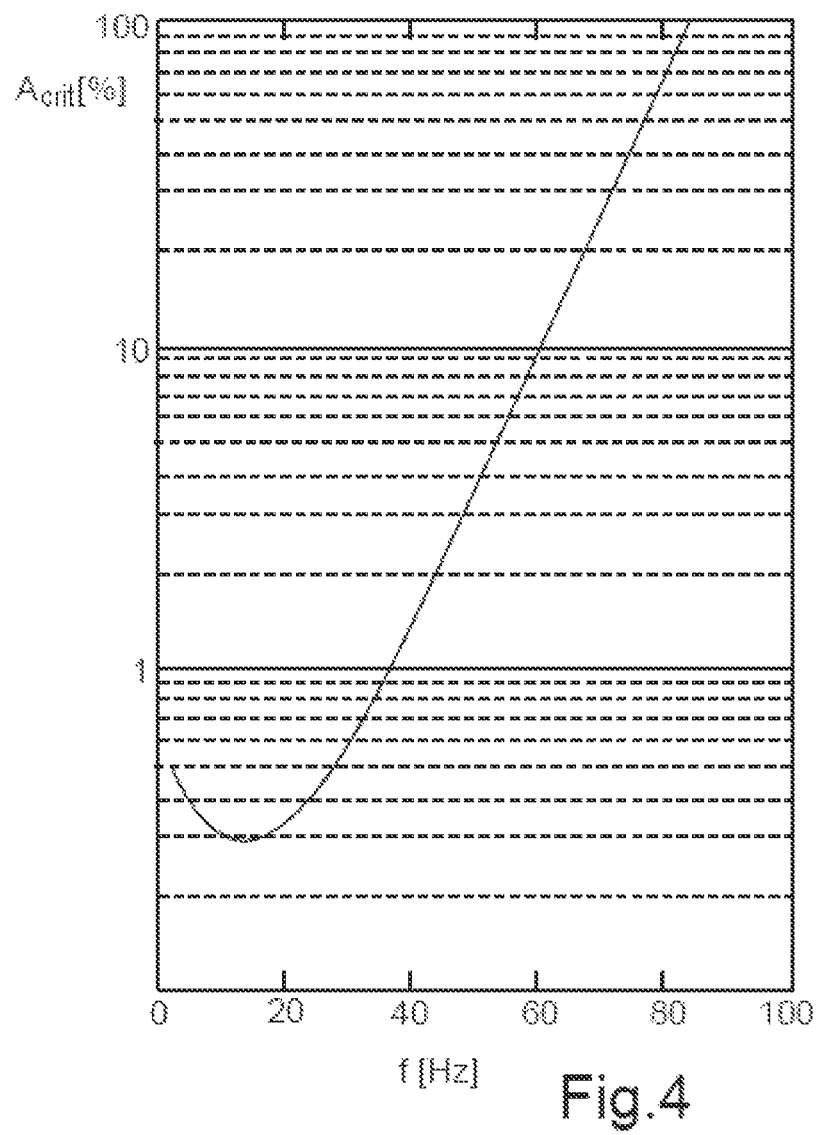

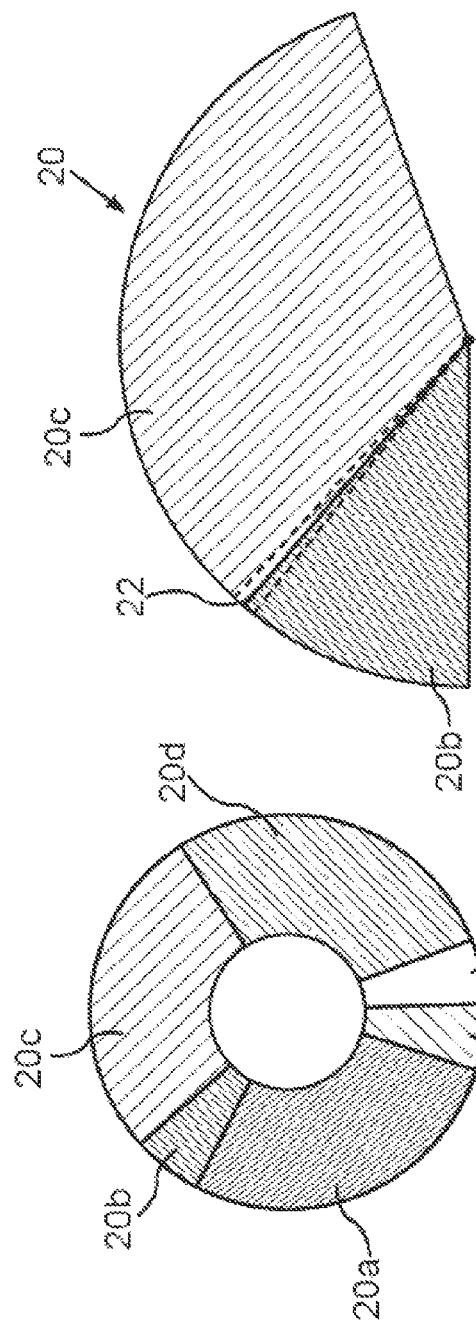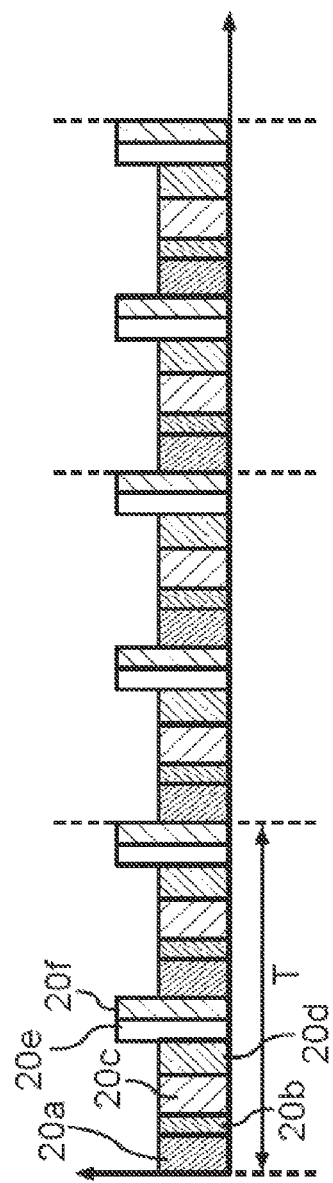

METHOD FOR DETERMINING A PREDEFINABLE WAVE FORM OF A LAMP CURRENT FOR OPERATING A DISCHARGE LAMP OF A PROJECTION ARRANGEMENT, AND PROJECTION ARRANGEMENT

CROSS-REFERENCE TO RELATED APPLICATION

This application claims priority to European Patent Application Serial No. 13185019, which was filed Sep. 18, 2013, and is incorporated herein by reference in its entirety.

TECHNICAL FIELD

Various embodiments relate generally to a method for determining a predefinable waveform of a lamp current for operating a discharge lamp of a projection arrangement and to a projection arrangement.

BACKGROUND

Conventional projection arrangements, such as DLP projectors, for example, include a color wheel and a discharge lamp, such as UHP lamps, for example, for illuminating the color wheel. In this case, the color wheel rotates at a predefined, e.g. constant, frequency. In this case, the lamps are operated with alternating current and driven by a ballast. The two electrodes of the discharge lamp undergo polarity reversal during a commutation of the lamp current. With adaptation of the operating frequency of the discharge lamp to the color wheel, the ballast provides a suitable lamp current having a specific wave form having a commutation scheme.

Furthermore, such projectors have an integrator. The latter is designed to mix the radiation emitted by different points of the arc between the electrodes during the operation of the discharge lamp by multiple reflection such that non-uniformities in the light level of the projected image are compensated for. Nevertheless, under certain circumstances, visible oscillations in the light level of the projected image occur, e.g. if, for cost reasons, the projector hardware cannot be optimized further, such as by the choice of an integrator which is longer in relation to its entrance area and is thus more effective.

SUMMARY

Various embodiments provide a method for determining a wave form of a lamp current for operating a discharge lamp of a projection arrangement having a color wheel and a ballast, such that a polarity of the electrodes is commutated in accordance with a commutation scheme of the wave form. The method involves providing a wave form having a commutation scheme and checking whether operation of the discharge lamp satisfies one criterion relating to a lifetime of the discharge lamp or a flicker amplitude of the projection arrangement. If the criterion checked is satisfied, checking whether operation of the discharge lamp satisfies the other of the two criteria is carried out. If at least these two criteria are satisfied, the wave form is stored in a memory of the projection arrangement and provided as the predefinable wave form at the ballast for the discharge lamp.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4 shows a graphical illustration of the dependence of the critical flicker amplitude on the flicker frequency relative to the average human eye;

FIG. 5a shows a schematic illustration of a six-segment color wheel;

FIG. 5b shows a schematic illustration of the progressive illumination of the individual segments of the color wheel in the case of 2× driving;

FIG. 5c shows a schematic illustration of an excerpt from the six-segment color wheel with the blind region situated between two segments;

DESCRIPTION

Figure 1:
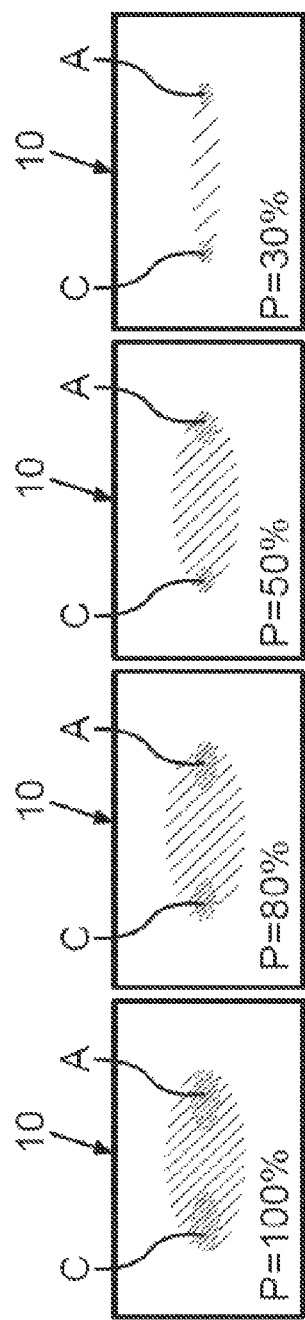
FIG. 1 shows a schematic illustration of embodiments of the arc attachment on the electrode tips in nominal operation, in ECO operation and in more greatly dimmed operating modes of a projection arrangement.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments provide a method for determining a predefinable wave form of a lamp current for operating a projection arrangement and a projection arrangement by means of which oscillations in the light level of a projected image can be reduced.

Various embodiments are based on the insight that oscillations in the light level of a projected image depend on the type of driving of the discharge lamp, e.g. on the configuration of a commutation scheme of a wave form of the lamp current with which the discharge lamp is driven.

The method according to various embodiments in accordance with the first aspect of the disclosure serves for determining a predefinable wave form of a lamp current for operating a discharge lamp of a projection arrangement in at least one first operating mode. In this case, the projection arrangement has a predefined rotatable color wheel and the discharge lamp for illuminating the color wheel, wherein the discharge lamp furthermore has two electrodes. Moreover, the projection arrangement includes a ballast for the discharge lamp, which ballast, during the operation of the projection arrangement, provides for the discharge lamp a lamp current embodied as alternating current and having the predefinable wave form, which has a predefinable commutation scheme, such that a polarity of the electrodes is commutated in accordance with the predefinable commutation scheme. The method according to the invention involves firstly providing at least one first wave form having a first commutation scheme. Furthermore, the method involves checking whether operation of the discharge lamp with a lamp current having the at least one first wave form satisfies one criterion of two criteria, wherein one of the two criteria relates to a lifetime of the discharge lamp and one of the two criteria relates to a flicker amplitude of the projection arrangement. If the one criterion is satisfied, a check is made as to whether operation of the discharge lamp with a lamp current having the at least one first wave form satisfies a further criterion of the two criteria. If at least the one criterion and the further criterion are satisfied, the at least one first wave form is stored in a memory of the projection arrangement and is provided as the predefinable wave form at the ballast for the discharge lamp.

The method according to various embodiments thus may make it possible to provide a wave form for a lamp current which not only fulfills the satisfaction of one criterion with regard to the lifetime of the discharge lamp, but can also reduce oscillations in the light level of a projected image as a result of the requirement of the satisfaction of the second criterion with regard to a flicker amplitude. Consequently, by means of a suitable choice of a commutation scheme for a wave form in accordance with these criteria, the flicker amplitude can be reduced and a significant improvement in a projected image and in the image quality can thus be achieved cost-effectively without the provision of additional and more expensive components, such as better integrators.

In one configuration of the method, if at least one of the two criteria is not satisfied, the first commutation scheme of the at least one first wave form is changed and then the procedure in accordance with the method according to the invention is repeated for the first wave form having the changed commutation scheme. By way of example, this once again involves firstly checking whether one of the two criteria with regard to lifetime or flicker amplitude is satisfied. In this case, it is unimportant, in principle, which of the two criteria is checked first in this case. For example, the criterion which takes less time to check is checked first. If the criterion checked first is satisfied, the satisfaction of the second criterion is checked. If the criterion checked first is not satisfied, then the second criterion need not even be checked at all, since the first wave form is provided for the ballast only if both criteria are satisfied. In other words, if the criterion checked first is not satisfied, then the commutation scheme is changed again and the first wave form having the commutation scheme changed anew is checked again for the satisfaction of one and, if appropriate, also of the second criterion, if the criterion checked first is satisfied, etc. In this case, the commutation scheme may be changed until a first wave form having a commutation scheme which satisfies both criteria is provided. In this case, the criteria with regard to lifetime and flicker amplitude can be predefined depending on the requirement. This method may thus ensure that a wave form ascertained as a result for a lamp current enables operation of the discharge lamp which satisfies the desired demands in respect of lifetime and flicker behavior.

In a further configuration of the disclosure, for determining a predefinable second wave form of the lamp current for operating the discharge lamp of the projection arrangement in at least one second operating mode different than the first operating mode, at least one second wave form having a second commutation scheme is provided. In this case, the commutation scheme is configured in such a way that it has an even number of commutations in a predefined time interval, wherein the time interval is predefined by the color wheel rotating twice during the operation of the projection arrangement in this time interval in the second operating mode. By way of example, this configuration relates to so-called 2× driving of the color wheel, in the case of which the color wheel rotates twice during a predetermined time duration, e.g. in $2/120 \text{ Hz} \approx 16.67$ ms, which corresponds to a rotational frequency of the color wheel of 120 Hz. As will be explained in even greater detail later, the provision of a commutation scheme having an even number of commutations makes it possible to shift the flicker frequency into a frequency range that is not visible to the human eye. Consequently, this configuration of the invention also makes it possible to hugely reduce the image flicker of a projected image, or even to completely eliminate the visibility of the flicker. In this case, this configuration of the commutation scheme having an even number of commutations not only can be taken as a basis for determining a lamp current for the second operating mode, but also can be implemented for the first operating mode described above. However, this embodiment of the commutation scheme precisely in a second operating mode, which can be configured as a dimmed, e.g. greatly dimmed, operating mode of the discharge lamp, may afford particularly great advantages, as will also be explained later.

In a further configuration of the method, the step of, as just described, providing the second wave form having the commutation scheme having an even number of commutations in the predefined time interval is furthermore followed by checking whether operation of the discharge lamp with a lamp current having the at least one second wave form satisfies one criterion relating to a lifetime of the discharge lamp. Moreover, if at least the criterion is satisfied, the at least one second wave form is provided as the second predefinable wave form at the ballast for the discharge lamp by means of the at least one second wave form being stored in a memory of the projection arrangement. Consequently, it can be ensured for the second wave form, too, that the latter satisfies a lifetime criterion.

In this case, too, the configuration is once again possible that, if the criterion is not satisfied, the second commutation scheme of the at least one second wave form is changed and then the step of checking whether the criterion with regard to the lifetime of the discharge lamp is satisfied is repeated. In this case, the second commutation scheme can once again be changed until the criterion is satisfied, and only then can the ballast be provided with the second wave form having the commutation scheme found.

In various embodiments, in the first operating mode the discharge lamp is operated in an undimmed fashion and/or up to a maximum degree of dimming. Furthermore, it may be the case that in the second operating mode the discharge lamp is operated at least occasionally with more than a minimum degree of dimming. In this case, dimming should be understood to mean a reduction of the operating power or of the operating current of the discharge lamp, and a degree of dimming should be understood to mean the reduction of the operating power or of the operating current in relation to a maximum operating power or operating current. Wave forms having an even number of commutations in the predefined time interval described enable the flicker frequency to be shifted to higher frequencies than in the case of wave forms having an odd number of commutations, as a result of which the flicker can be shifted out of the visible range of the eye. However, wave forms having an odd number of commutations may have the advantage that discharge lamps operated with a lamp current in accordance with these commutation schemes have longer lifetimes on average. However, since the electrodes of the discharge lamp are subjected to significantly less loading precisely in greatly dimmed operating modes of the discharge lamp, this lifetime-decreasing effect caused by an even number of commutations can be compensated for by the reduced loading of the electrodes in the second, e.g. dimmed, operating mode. Furthermore, with provision of a lamp current in accordance with a commutation scheme having an even number of commutations, it may also be no longer necessary to carry out additional checking as to whether the discharge lamp operated with the lamp current in accordance with this commutation scheme satisfies one criterion with regard to a flicker amplitude.

In the first, e.g. undimmed or less greatly dimmed, operating mode, by contrast, in favor of the lifetime, a wave form having an odd number of commutations may be provided, e.g. since the provision of the second criterion with regard to the flicker amplitude thus nevertheless makes it possible to determine wave forms by means of which flicker-free operation of the projection arrangement is possible. Therefore, in a further configuration of this disclosure, the first commutation scheme in the step of providing is chosen such that it has an odd number of commutations in a time interval in which the color wheel rotates twice.

In a further configuration of this disclosure, checking whether the criterion with regard to the lifetime is satisfied for the first and respectively second operating modes involves determining the expected lifetime of the discharge lamp during operation of the discharge lamp with a lamp current having the first and respectively second wave forms, wherein the criterion is satisfied if the lifetime determined is greater than or equal to a predefined limit value. In this case, the expected lifetime can be determined by extrapolation methods, for example by a procedure in which the discharge lamp is operated over a specific period of time with a lamp current in accordance with the wave form provided, and the development of the embodiment or change in shape of the electrodes of the discharge lamp or the change in the electrode voltage during this period of time is taken into consideration, measured or documented and a prediction about the lifetime is made from these items of information. However, provision can also be made for operating the discharge lamp until the end of its lifetime and thus determining the lifetime for discharge lamps and/or discharge lamp types of the same kind directly, i.e. without estimation or extrapolation. It should be noted here that, in the method steps for checking said criteria such as lifetime and/or flicker amplitude, discharge lamps are used which, with respect to those which are ultimately used for operation in the projection arrangement, are of the same kind, e.g. of the same lamp type, but need not be identical.

In a further configuration of this disclosure, checking whether the criterion with regard to the flicker amplitude is satisfied involves ascertaining, for a predefinable number of different degrees of dimming of the discharge lamp, in each case a flicker amplitude of a photometric variable of the light output by the projection arrangement during the operation of the discharge lamp with the first wave form. In this case, the criterion is satisfied if the flicker amplitudes ascertained in each case in relation to an average value of the photometric variable are less than or equal to a predefined limit value. In this case, the photometric variable can be e.g. a luminous flux that is measured in terms of its temporal profile at one measurement location or a plurality of measurement locations or for one or a plurality of measurement points, such as e.g. at one or a plurality of locations of a projected image, e.g. of a temporally unvarying test image, wherein the fluctuations of the luminous flux in terms of its temporal profile represent the flicker amplitude and the latter is related to the average luminous flux, e.g. averaged over a time interval, in order to obtain a relative flicker amplitude. However, an illuminance, a luminance, a light intensity, etc. can also be used as the photometric variable. The criterion with regard to the flicker amplitude is therefore satisfied if, for the different degrees of dimming, the relative flicker amplitudes respectively measured are less than or equal to a predefined limit value. In this case, said predefined limit value is, for example, the same for the respective flicker amplitudes. Furthermore, said limit value depends on the flicker frequency and can be determined on the basis of a graphical and/or tabular assignment of a respective critical flicker amplitude as limit value to a corresponding flicker frequency.

In various embodiments, in the case of 2× driving of the color wheel and operation of the discharge lamp with a lamp current in accordance with a commutation scheme having an odd number of commutations, the relative flicker amplitude should not exceed a limit value of 1%-1.5%.

Furthermore, in this configuration it may be provided to measure the flicker amplitudes for different degrees of dimming, since the behavior of the discharge lamp over the course of its lifetime can be simulated by different degrees of dimming. The flicker amplitude measured for a specific degree of dimming of the discharge lamp in this case corresponds to the flicker amplitude of the (undimmed) discharge lamp at a specific age. In this regard, it is advantageously possible to determine how the flicker behavior of the discharge lamp changes in the course of its aging, without having to run through the complete lifetime of the discharge lamp in the process. By means of this checking method, it may thus be possible to ensure that, for a given wave form which satisfies this criterion with regard to the flicker amplitude, it can be ensured that no visible flicker occurs even over the course of the entire lifetime of the discharge lamp.

In order to provide a determination of a suitable commutation scheme of a wave form, even further criteria and/or boundary conditions can be stipulated with regard to the commutation scheme, which are taken into account e.g. each time the first and/or second wave form are/is provided, as described in greater detail below.

In one configuration of this disclosure, the color wheel has a predefined number of color segments, and the projection arrangement is embodied in such a way that during the operation of the projection arrangement the discharge lamp illuminates a predefined region of the color wheel which is smaller than a respective color segment. In this case, providing the first and respectively second wave forms having the first and respectively second commutation schemes involves choosing the first and respectively second commutation schemes in adaptation to a predefined rotation frequency of the color wheel during the operation of the projection arrangement in the first and respectively second operating modes and in adaptation to an arrangement and embodiment of the segments of the color wheel such that during the operation of the projection arrangement in the first and respectively second operating modes a commutation of the lamp current takes place only if the predefined illuminated region is situated in a transition region between two segments of the color wheel. This configuration may be advantageous since a commutation of the lamp current inevitably entails a momentary fluctuation of the light level. In order that this does not affect a projected image, commutation is effected only during a blind region situated between two color segments, a so-called spoke, since the latter does not contribute to the overall light.

In a further configuration of this disclosure, the commutation scheme in the step of providing is chosen such that it is temporally periodic with respect to a predefinable periodicity interval. In this case, said periodicity interval may be a multiple of a time interval in which the color wheel has rotated once, that is to say e.g. 16.67 ms, 33.33 ms, 50 ms, 66.67 ms, etc. This simplifies the implementation of the commutation scheme and makes it possible, in a simple manner, to implement further boundary conditions imposed on the commutation scheme, such as e.g. the following.

In this case, the commutation scheme in the step of providing may be chosen such that, with respect to the periodicity interval, the electrodes of the discharge lamp, during the operation of the discharge lamp with a lamp current in accordance with the commutation scheme, are operated with a first polarity for the same time as with a second polarity, wherein as a result of a commutation the electrodes of the discharge lamp change from the first polarity to the second polarity, or vice versa. Consequently, over this periodicity interval both electrodes are in an anodic and cathodic phase in each case for the same time. This condition thus ensures uniform loading and identical growth of both electrodes, which is beneficial for the lifetime of the discharge lamp.

A second aspect of this disclosure provides a method for determining a predefinable wave form of a lamp current for operating the discharge lamp of the projection arrangement in at least one operating mode. In this case the projection arrangement has a predefined rotatable color wheel and the discharge lamp for illuminating the color wheel, wherein the discharge lamp has two electrodes, and wherein the projection arrangement has a ballast for the discharge lamp, which ballast, during the operation of the projection arrangement, provides for the discharge lamp a lamp current embodied as alternating current and having the predefinable wave form, which has a predefinable commutation scheme, such that a polarity of the electrodes is commutated in accordance with the predefinable commutation scheme. In the method according to various embodiments in accordance with the second aspect, at least one wave form having a commutation scheme is provided. In this case, the commutation scheme is constituted in such a way that it has an even number of commutations in a predefined time interval, wherein the time interval is predefined by the color wheel rotating twice during the operation of the projection arrangement in this time interval in the second operating mode. Moreover, the method involves checking whether operation of the discharge lamp with a lamp current having the at least one wave form satisfies a criterion which relates to a lifetime of the discharge lamp. Furthermore, if at least the one criterion is satisfied, the at least one wave form is stored in a memory of the projection arrangement and is provided as the predefinable wave form at the ballast for the discharge lamp.

This method in accordance with the second aspect of this disclosure relates, for example, to the configuration of the method in accordance with the first aspect of this disclosure for determining the second wave form for the second, e.g. the dimmed, operating mode of the projection arrangement. Consequently, the features, feature combinations, configurations and their advantages as mentioned for the first aspect and the configurations mentioned with regard to determining the second wave form, apply in the same way to the method according to various embodiments in accordance with the second aspect of this disclosure.

Furthermore, various embodiments relate to a projection arrangement in accordance with the first aspect, said projection arrangement including a predefined rotatable color wheel and a discharge lamp for illuminating the color wheel, said discharge lamp including two electrodes. Furthermore, the projection arrangement has a ballast for the discharge lamp, which ballast is designed to provide, during the operation of the projection arrangement, for the discharge lamp a lamp current embodied as alternating current and having a predefined wave form, which has a predefined commutation scheme, such that a polarity of the electrodes is commutated in accordance with the predefinable commutation scheme. Moreover, the projection arrangement has a memory, in which the at least one first wave form is stored, wherein the wave form stored in the memory is embodied in such a way that one criterion with regard to a lifetime of the discharge lamp and a further criterion with regard to a flicker amplitude of the discharge lamp are satisfied during operation of the discharge lamp with a lamp current having the first wave form.

In this case, all features, feature combinations, configurations and their advantages as mentioned for the method according to the invention in accordance with the first aspect of this disclosure, if applicable, also apply to the projection arrangement according to various embodiments in accordance with this first aspect. Moreover, the method features mentioned enable the development of the projection arrangement according to various embodiments by corresponding substantive features.

Furthermore, various embodiments relate to a projection arrangement in accordance with the second aspect. This projection arrangement includes a predefined rotatable color wheel and a discharge lamp for illuminating the color wheel, said discharge lamp having two electrodes. The projection arrangement furthermore has a ballast for the discharge lamp, which ballast is designed to provide, during the operation of the projection arrangement, for the discharge lamp a lamp current embodied as alternating current and having a predefined wave form, which has a predefined commutation scheme, such that a polarity of the electrodes is commutated in accordance with the predefined commutation scheme. Moreover, the projection arrangement has a memory, in which the at least one predefined wave form is stored. In this case, the commutation scheme is constituted in such a way that it has an even number of commutations in a predefined time interval, wherein the time interval is predefined by the color wheel rotating twice during the operation of the projection arrangement in this time interval. The wave form stored in the memory is furthermore embodied in such a way that operation of the discharge lamp with a lamp current having the predefined wave form satisfies one criterion with regard to a lifetime of the discharge lamp.

In this case, all features, feature combinations, configurations and their advantages as mentioned for the method according to this disclosure, e.g. in accordance with the first and second aspects of this disclosure, if applicable, also apply to the projection arrangement according to various embodiments. Moreover, the method features mentioned enable the development of the projection arrangement according to various embodiments by corresponding substantive features.

The projection arrangement, e.g. in accordance with the first and second aspects of this disclosure, in this case e.g. includes a memory which is accessible by the ballast and which can be integrated into the ballast. In this case, respectively one or else respectively a plurality of wave forms can be stored for one operating mode, e.g. the first and/or the second operating mode, or else for a plurality of different operating modes of the projection arrangement. In this case, the ballast is designed, during the operation of the projection arrangement, to drive the discharge lamp with a lamp current in accordance with a stored wave form chosen by the ballast depending on a chosen operating mode or operating mode set on the projection device, e.g. by a user. In this case, it can furthermore be provided that a plurality of wave forms having different commutation schemes are stored for an operating mode and the ballast for driving the discharge lamp during operation automatically chooses one of these wave forms according to predetermined criteria or changes the wave form according to predetermined criteria. By way of example, in a dynamic dimming mode, in which the current intensity or the degree of dimming of the discharge lamp is dynamically adapted to the brightness of the image to be projected, a corresponding wave form can be chosen for different current intensities and/or degrees of dimming, e.g. such that the operation of the discharge lamp is optimized with regard to a flicker amplitude and/or a lifetime.

If the UHP lamps used in DLP projectors are operated below the predefined nominal power, then visible oscillations in the light level of the projected image can occur. This phenomenon is associated firstly with the physical processes at the lamp electrodes, and secondly with the interplay of discharge lamp and color wheel in the light engine of the projector. If the AC driving of the discharge lamp has an unfavorable operating frequency, then in interaction with the synchronized color wheel this results in an oscillation of the light used for the projection. This effect becomes all the greater, the more greatly the discharge lamp is dimmed, since the embodiment of the light coupling-out from the regions of the arc just from the electrode tips (light centroids) into the light engine of the projector can change greatly depending on the electrical polarity of the electrode.

One important prerequisite for the identifiability of the abovementioned effect is, however, an insufficient mixing of the light emitted by both light centroids by the integrator, likewise situated in the light engine. With an increasing imbalance of the use of both light centroids, the amplitude of the observed oscillations also rises significantly. Therefore, if the projector hardware, for example for cost reasons, cannot be optimized further, such as e.g. by the choice of a longer and thus more effective integrator, the driving of the discharge lamp has to be adapted to the given conditions, as is made possible for the first time by the invention. In the dimmed state of the discharge lamp, the light from the two arc centroids, even with the use of a longer integrator, can moreover only be mixed insufficiently. In this case, the effect described above can be counteracted only by a skillful adaptation of lamp operation that is made possible by various embodiments.

Various insights underlying various embodiments will be illustrated here in FIG. 1 to FIG. 7.

FIG. 1 shows a schematic illustration of the embodiment of the arc attachment on the electrode tips of the arc 10 between the electrodes in the illustrations from left to right in nominal operation P=100%, i.e. at a maximum operating power of the discharge lamp, in ECO operation P=80%, i.e. at 80% of the maximum operating power, and in more greatly dimmed operating modes P=50% and P=30%. It can clearly be discerned that the cathodic arc attachment C changes with the power (current) to a greater extent than the anodic arc attachment A, which can be discerned from the increasing differences in brightness between the anodic arc attachment A and the cathodic arc attachment C in the illustrations with decreasing power. The same effect is also manifested to a smaller extent during the electrode cooling phases (cathode) within a wave form cycle.

In nominal operation, the arc 10 burning between the two tungsten electrodes attaches to the electrode tips in the so-called spot mode. In AC operation, the embodiment of this electrode attachment changes depending on the polarity, anode or cathode, with which the electrode is currently being operated. The current in the arc 10 is carried for the most part by electrons. Therefore, electrons have to be constantly released at the surface of the cathode. In the region of the cathodic boundary layer, ions are generated by electron impacts and accelerated toward the surface by the cathode drop. While the electrons flow away to the column of the arc 10, the ion bombardment heats the surface of the cathode. Part of the thermal energy supplied is transferred in this case to the solid-state electrons and brings about the emergence thereof.

In order to extract enough electrons from the electrode material, the cathodic arc attachment C contracts to a greater extent in comparison with the anodic phase or the anodic arc attachment A, and thus attaches on the electrode tip in an extremely delimited manner. In this case, a large proportion of the generated light is emitted from a very small region directly in front of the cathode surface. The difference in the localization of the light emission between cathodic arc attachment C and anodic arc attachment A becomes all the greater, the further the discharge lamp is dimmed. In the extreme case, the plasma contracts in the cathodic phase to form an extremely contracted arc attachment C, while in the anodic phase it still attaches diffusely to the electrode tip. Accordingly, the light in the anodic phase is emitted from an angular range that is much larger in comparison. This effect occurs whenever the arc current or the lamp current either is decreased actively from outside, e.g. by dimming, or decreases oppositely to the rise in the voltage level, said rise being caused by burn-back, on account of the power regulation of the ballast over the lifetime. The susceptibility to flicker therefore generally increases with advancing lifetime of the discharge lamp.

Figure 2:
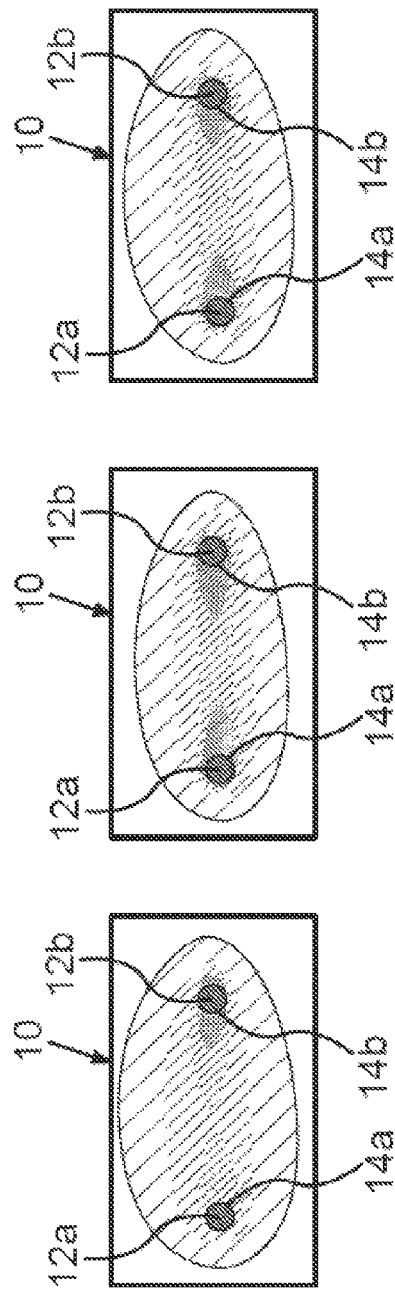
FIG. 2 shows a schematic illustration of the embodiment of the arc attachment at different times of the AC driving of the discharge lamp in the phase-resolved arc projection.

FIG. 2 shows the embodiment of the arc attachment in a phase-resolved arc projection of the arc 10, i.e. if one electrode changes from the anodic to the cathodic phase and the other electrode changes from the cathodic to the anodic phase. The illustration on the left shows the right electrode in the cathodic phase and the left electrode in the anodic phase during driving by a maintenance pulse. In the illustration on the right, the polarity has already reversed. The light centroids 12a and 12b in front of the electrode tips are clearly discernible, which are respectively identified by the circularly demarcated regions 14a and 14b.

The possible effects of the arc centroids 12a and 12b embodied to different extents in the different phases, anodic and cathodic, on the brightness level of a projected image will be illustrated with reference to FIG. 3.

Figure 3:
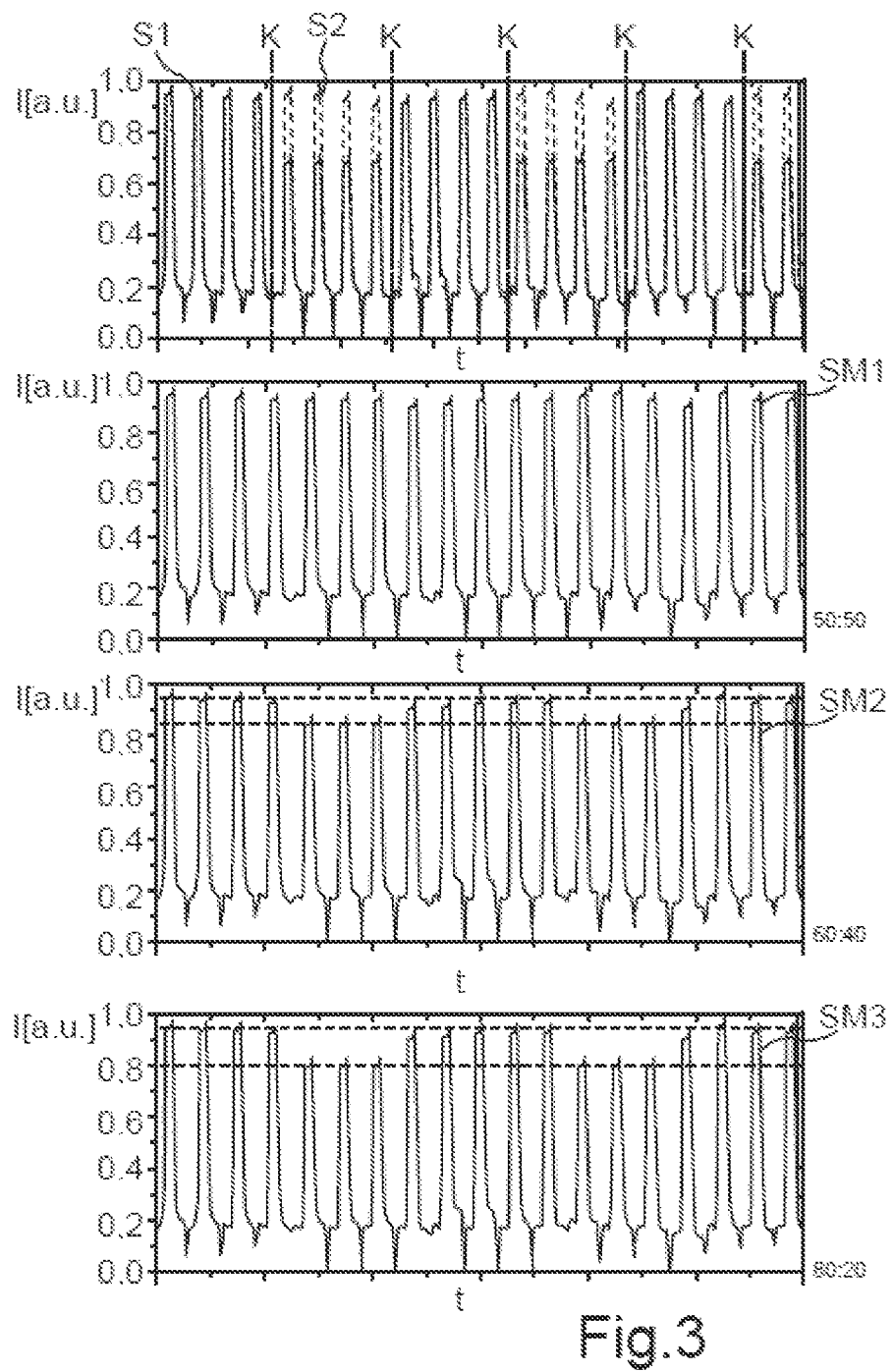
FIG. 3 shows a schematic illustration of the light signal from a region just in front of a respective electrode tip during AC driving, and the mixed light signals resulting from the light mixing of the light from the respective regions in front of the electrode tips for different mixing ratios.

FIG. 3 shows a graphical illustration of light signals S1 and S2 from the regions 14a and 14b (cf. FIG. 2) just from a respective electrode tip in terms of the temporal profile during AC driving of the discharge lamp, and the mixed light signals resulting from the light mixing of the light from the respective regions 14a and 14b in front of the electrode tips for different mixing ratios.

In FIG. 3 at the top, here the curves of the light signals S1 and S2 are plotted as intensity I in arbitrary units against time t. In this case, the light signal S1 corresponds to the region 14a—schematically demarcated as a circle in FIG. 2—just in front of the first electrode tip and the light signal S2 corresponds to the region 14b—schematically demarcated as a circle in FIG. 2—just in front of the second electrode tip. It can clearly be discerned here that upon each commutation K of the lamp current, that is to say upon a change in polarity of the two electrodes, the respective light signals S1 and S2 alternately decrease and increase in their intensity.

The three graphs underneath indicate the resulting mixed light signal with increasing detuning of the centroid proportion, e.g. caused by an excessively short integrator. The second illustration from the top shows here the mixed light signal SM1 in the case of a mixing of the light signals S1 and S2 in the ratio 50:50, the third illustration from the top shows the mixed light signal SM2 in the case of a mixing of the light signals S1 and S2 in the ratio 60:40, and the fourth illustration from the top shows the mixed light signal SM3 in the case of a mixing of the light signals S1 and S2 in the ratio 80:20.

In the projector, the light from the two different kinds of light centroids 12a and 12b at every point in time is mixed with the aid of an optical integrator and used for generating the image on the projection surface. If the light of both arc centroids 12a and 12b, after the mixing by the integrator, contributes in each case 50% to the overall quantity of light coupled out, then the change in the electrode attachment has no influence on the brightness level, since the average light level stays at a constant value.

If, on account of a lower-quality integrator, a detuning of the light proportion from the respective arc centroids 12a and 12b occurs, e.g. 60:40, and if possibly even to a large proportion the light only from one of the arc centroids 12a or 12b is used for projection, then a regular fluctuation of the light level occurs on account of the continuous change in polarity, since the angular range from which the light is emitted changes greatly upon the change from the anodic to the cathodic mode. Upon this change, the light level again varies all the more greatly, the further the discharge lamp is dimmed and the more greatly the cathodic arc attachment C contracts as a direct consequence.

FIG. 4 illustrates the physiological bases of flicker perception and conclusions resulting therefrom. The extent to which a flickering projection image is perceived or found to be disturbing by the viewer depends greatly on its amplitude and oscillation frequency. Systematic investigations have revealed that a light oscillation below a certain amplitude or above a certain frequency can no longer be perceived by the human eye. FIG. 4 shows the stated relationship in the form of a graphical representation of the dependence of the relative critical flicker amplitude $A_{crit}$ on the flicker frequency f relative to the average human eye. In this case, the relative critical flicker amplitude $A_{crit}$ indicates the ratio of the critical flicker amplitude to the overall signal, e.g. in percent, wherein the critical flicker amplitude is the flicker amplitude for which flicker at the corresponding flicker frequency f can only just or can just no longer be perceived by an eye. The relative critical flicker amplitude $A_{crit}$ rises relatively sharply for frequencies above f=10 Hz. At f=40 Hz the flicker amplitude of a light signal must not exceed a proportion of approximately 1% of the overall signal, in order to remain undetected. If the flicker frequency f attains a value of f=60 Hz, then the relative critical flicker amplitude $A_{crit}$ already increases by a power of ten. The eye accordingly becomes more sluggish as the flicker frequency f rises.

If it is desired to utilize the effect just described for eliminating image flicker, then the above-described oscillation has to be allowed to proceed with a sufficiently high frequency in order that the signal amplitude that unavoidably arises is sufficiently concealed for the viewer.

In accordance with one aspect of this disclosure, this effect is utilized by the commutation scheme of the wave form of the lamp current being designed or provided such that the flicker frequency f is shifted toward very high frequencies, such that the flicker is no longer visible to a viewer. In various embodiments, in the case of 2× driving, this can be realized by means of a commutation scheme having an even number of commutations K. A further aspect of this disclosure makes use of the insight, moreover, that the flicker amplitude also changes depending on the commutation scheme, such that in the case of an excessively high flicker amplitude of a given commutation scheme, e.g. at a given flicker frequency f, by changing said commutation scheme it is possible to reduce the flicker amplitude, e.g. to below the relative critical flicker amplitude $A_{crit}$ corresponding to the flicker frequency f.

The frequency of the image flicker (scintillation), e.g. the flicker frequency f, can be controlled by means of the frequency of the lamp current. For this purpose, the lamp current is commutated multiply within a color wheel revolution at different times and depending on the operating frequency to be obtained. Since the commutation K inevitably entails a momentary fluctuation of the light level, commutation is preferably effected only during a blind region 22 (spoke) of the color wheel 20 situated between two color segments 20a, 20b, 20c, 20d, 20e, 20f (cf. FIG. 5a and FIG. 5c), since said region does not contribute to the overall light.

FIG. 5a shows a schematic illustration of a six-segment color wheel 20 and FIG. 5b shows a schematic illustration of the progressive illumination of the individual segments 20a, 20b, 20c, 20d, 20e, 20f of the color wheel 20 during 2× driving. In this case, the color wheel 20 has six segments 20a, 20b, 20c, 20d, 20e and 20f of different colors, which are illuminated progressively by the discharge lamp during rotation of the color wheel 20. In this case, the temporal sequence of this progressive illumination in terms of the temporal profile is illustrated schematically in FIG. 5b for 2× driving where the color wheel 20 rotates twice in the predefined time interval T=16.67 ms, which corresponds to a rotational frequency of the color wheel 20 of 120 Hz. FIG.

5c furthermore shows an excerpt from the color wheel 20 in order to illustrate the blind region 22 situated between the two segments 20b and 20c.

As a boundary condition in accordance with one embodiment of this disclosure, provision is made for performing commutations K e.g. only at the end of a respective color segment 20a, 20b, 20c, 20d, 20e, 20f, that is to say that when a wave form having a commutation scheme is provided, said commutation scheme is configured in adaptation to the rotational frequency of the color wheel 20 and in adaptation to the arrangement and embodiment of the segments 20a, 20b, 20c, 20d, 20e, 20f of the color wheel 20 in such a way that a commutation K of the lamp current takes place only if that region of the color wheel 20 which is illuminated by the discharge lamp is situated in a transition region, i.e. in the blind region 22, between two segments 20a, 20b, 20c, 20d, 20e, 20f of the color wheel 20.

Figure 6A:
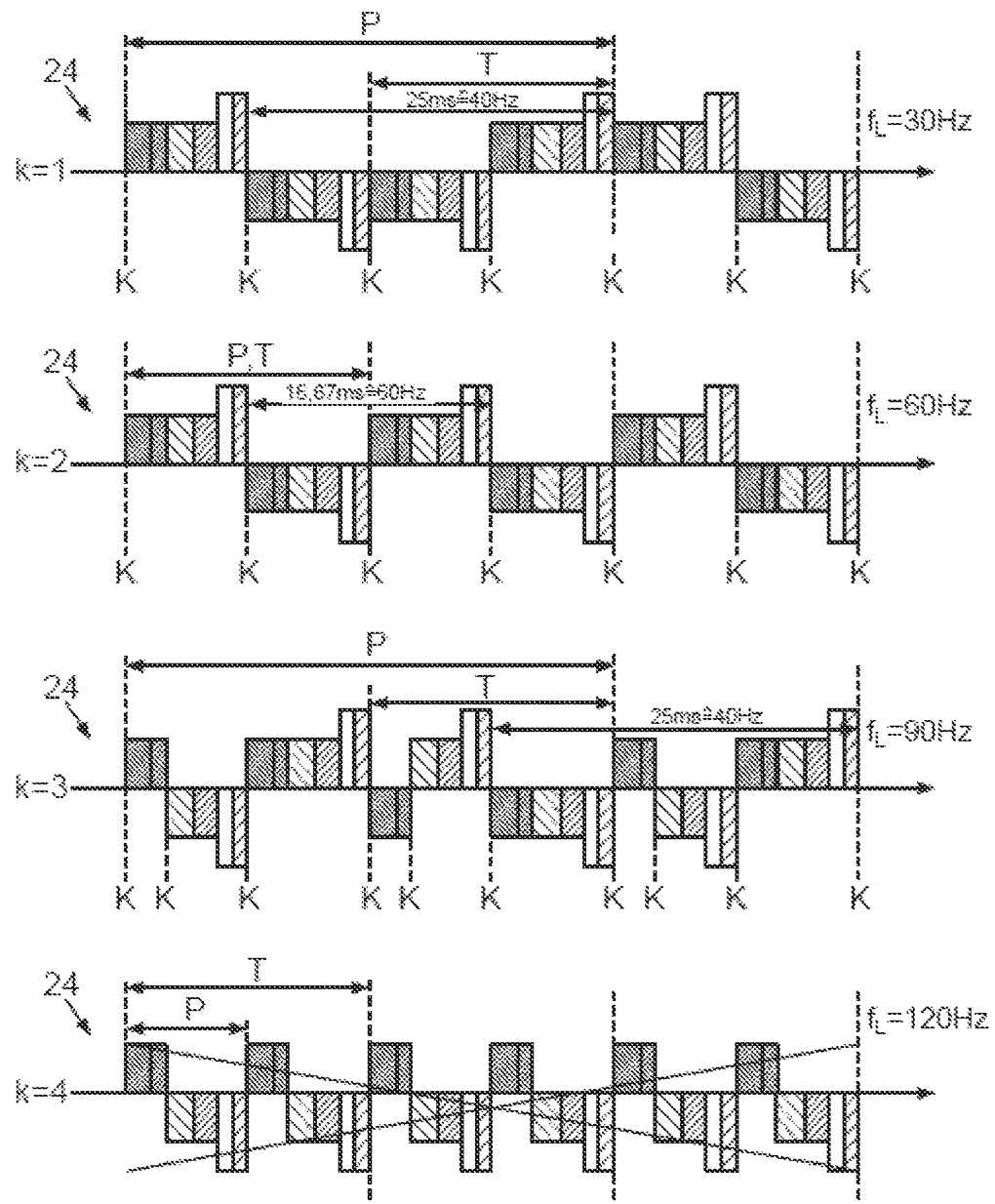
FIG. 6a shows a schematic illustration of commutation schemes for different numbers of commutations.
Figure 6B:
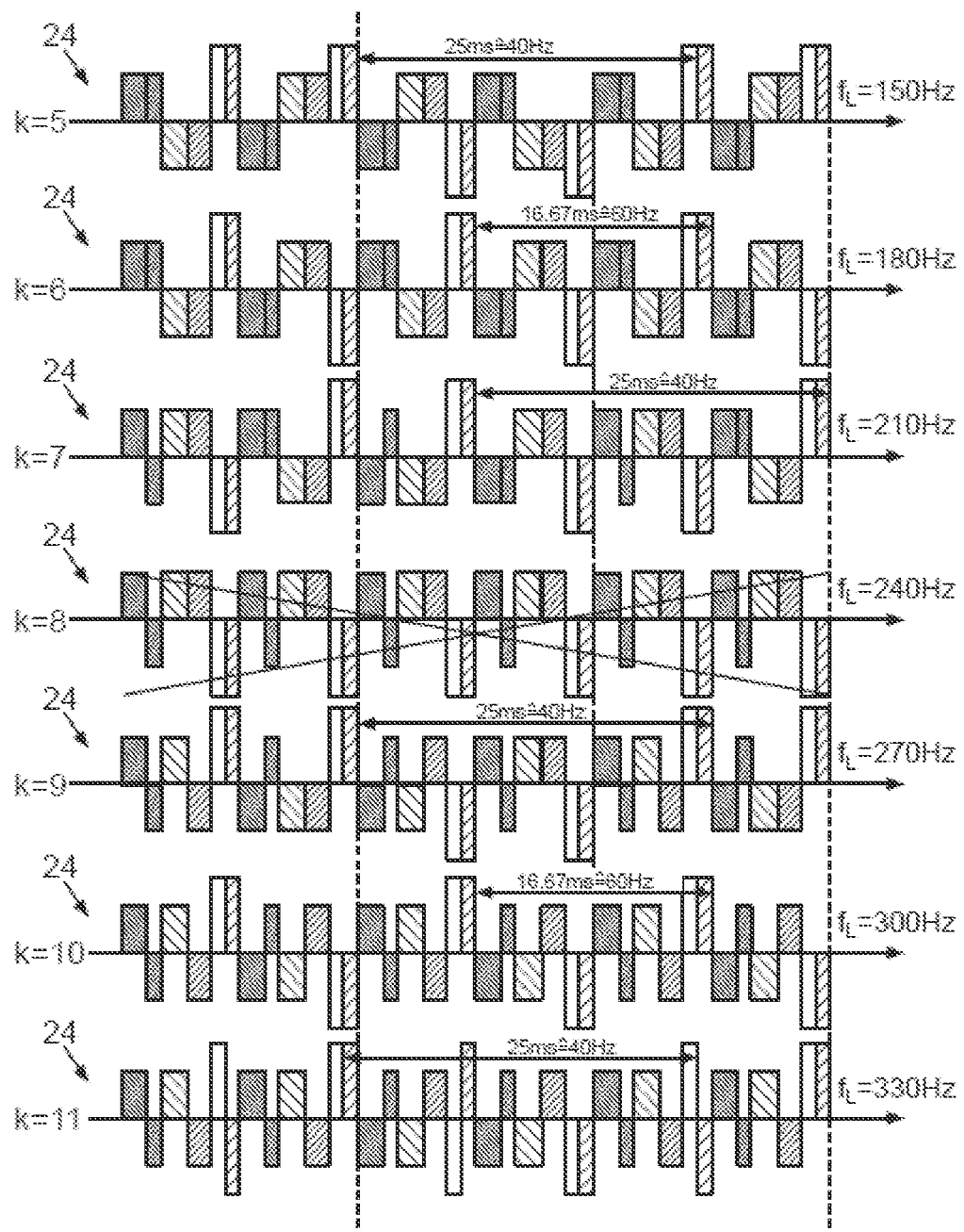
FIG. 6b shows a schematic illustration of further commutation schemes for different numbers of commutations.

FIG. 6a and FIG. 6b show schematic illustrations of examples of commutation schemes 24 for different numbers k of commutations K. For a color wheel 20 having n segments 20a, 20b, 20c, 20d, 20e, 20f and k commutations K provided, this results in a very high number of 2n over k wave form permutations, of which a wave form permutation is illustrated by way of example for the case n=6 for each n=1 . . . 11. However, not all wave forms are physically expedient, rather only the wave forms which lead to balanced driving of the electrodes, that is to say have no DC component, that is to say e.g. those commutation schemes 24 in accordance with which a respective electrode, during the operation of the discharge lamp, is in an anodic phase for the same time as in a cathodic phase in relation to the periodicity interval P according to which the commutation scheme 24 is repeated. The illustrated examples for k=4 and k=8 commutations K do not comply with this requirement and have therefore been scored through.

In the course of the 2× driving, the color wheel 20 rotates twice in T=16.67 ms. In the case of a single commutation K within this time interval T, a lamp frequency of $f_L$=30 Hz results therefrom. In various embodiments, the lamp frequency is defined in this case as double the number of commutations K divided by the time interval T, i.e. $f_L$=(2n)/T. With each further commutation K, the frequency $f_L$ of the lamp current increases by 30 Hz in each case. Since the commutations K can be close together depending on the length of the individual color segments 20a, 20b, 20c, 20d, 20e, 20f, a curve progression composed of multifrequency portions arises in reality, however.

The illustrated sequence of the commutation schemes 24 reveals that, for example, the white segments 20e and 20f (cf. FIG. 5b) can be commutated only according to two possible schemes. They follow a frequency of f=60 Hz in the case of an even number k of commutations and a lower frequency of f=40 Hz, which is thus beneficial for the flicker effect, in the case of odd numbers k of commutations. These stated frequencies f correspond in this case to the flicker frequency f described with regard to FIG. 4. In various embodiments, the flicker frequency f represents the inverse of the time interval that elapses if a segment 20a, 20b, 20c, 20d, 20e, 20f illuminated with a first polarity of the discharge lamp, in this case the white segments 20e, 20f, of the color wheel 20 is repeatedly illuminated with this first polarity of the discharge lamp, and was illuminated with opposite polarity of the discharge lamp at least once during this time interval.

Similar relationships also arise, of course, for projector operating modes which use more rapidly rotating color wheels 20, e.g. in the case of 3× driving. Since the white segments 20e and 20f are in addition generally driven with a higher current, which is intended to be represented by the increased representation of the white segments, the flicker becomes apparent to a particularly great extent here, if appropriate. If other color segments 20a, 20b, 20c, 20d are driven excessively, the effect mentioned occurs especially in these colors. This is referred to as color flicker.

In order to avoid the flicker, in principle, lamp operation can follow an even commutation scheme 24, i.e. k=2, 4, 6, 8, . . . . It should be taken into consideration that with this method in accordance with FIG. 4 all light fluctuations that arise below an amplitude proportion of 10% can be compensated for, which represents a very large tolerance range of the flicker amplitude. The method of choosing even numbers k of commutations is recommended here e.g. for greatly dimmed operation of the lamps (DynamicEco+), since in this case a possible reduction of the lifetime of the discharge lamp can be compensated for by the electrodes subjected to significantly lower loading in this operating mode.

FIG. 6a and FIG. 6b additionally show that the electrodes remain in a polarity for alternate lengths of time depending on the chosen number k of commutations K. Since the electrode surface is subjected to a cooling effect in the cathodic phase as a result of electron extraction, the cathodic arc attachment C contracts more and more during this phase. The light is therefore emitted from a smaller and smaller angular range. If the electrode changes to the anodic phase, e.g. in the case k=1 after the elapsing of t=16.76 ms, the electrode is spontaneously heated and, on account of the change in the size of the light centroid 12a, 12b, the coupling-out of light jumps instantaneously to a larger angular range, which in conjunction with an integrator of unfavorable design can be perceived as light fluctuation on the projection surface.

As the number k of commutations increases, the cooling time decreases significantly during the cathodic phase, since commutation then also has to be effected more frequently between the white segments 20e, 20f. It goes without saying that the electrode is also heated more briefly in the anodic phase. The temperature swing between anodic and cathodic phases accordingly becomes smaller and smaller as the lamp frequency $f_L$ rises. The difference between anodic arc attachment A and cathodic arc attachment C decreases and is determined only by the general dimming level.

Figure 7:
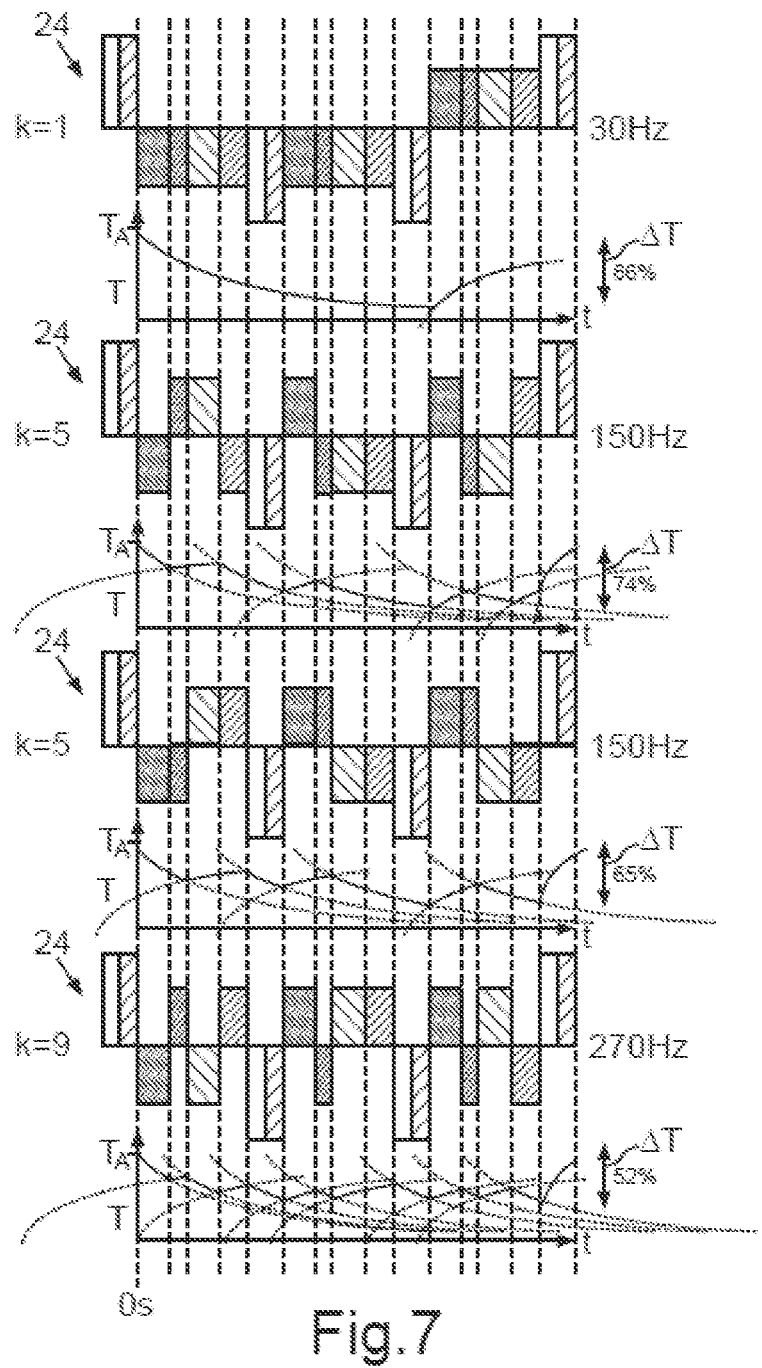
FIG. 7 shows a schematic illustration of the temperature fluctuations of an electrode during operation with a lamp current in accordance with the likewise illustrated commutation schemes for different numbers of commutations.

FIG. 7 shows a schematic illustration of the temperature T of an electrode during operation with a lamp current in accordance with the likewise illustrated commutation schemes 24 for different numbers k of commutations in a simple model consideration.

At the beginning of the first commutation K, the electrode has an initial temperature $T_A$, the same initial temperature $T_A$ always being assumed in the illustrations of the temperature profiles. After the first commutation K, i.e. at t=0 s, the electrode cools until the next commutation K. After the latter, the temperature of the electrode rises again until the subsequent commutation K, etc. The temperature swing over the time interval considered is 86% in the first example for k=1 illustrated at the top. In this case, the percentages represent the temperature difference ΔT between the maximum and minimum temperatures occurring in this time interval in relation to the initial temperature $T_A$.

As is evident, the temperature T of an electrode changes all the more greatly, the less often the electrode is commutated. If the frequency of the commutations K increases, then less time for heating or cooling remains for the electrode. Accordingly, the electrode temperature T oscillates more weakly around an average level and the arc attachment changes to a lesser extent, as a result of which the flicker amplitude decreases.

Even at a flicker repetition frequency f of 40 Hz, the discernibility of the flicker can be significantly reduced by this measure in the individual case. Moreover, from the two illustrations for k=5, which each represent a commutation scheme 24 having the same number k of commutations K, but with a different permutation of the commutations K, it can be concluded that the fluctuations of the temperature level and thus the amplitude of the flicker can indeed likewise be controlled or reduced by a skillful permutation of a fixed number k of commutations K.

All these insights can be utilized advantageously for determining a wave form of a lamp current for operating a discharge lamp of a projection arrangement.

Figure 8:
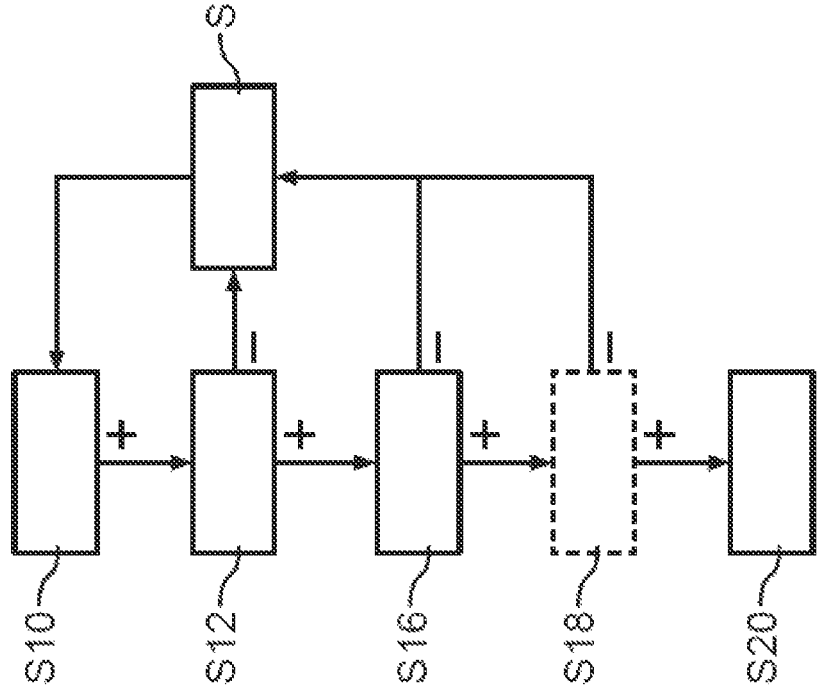
FIG. 8 shows a flow chart of a method for determining a wave form of a lamp current for operating a discharge lamp of a projection arrangement in a first operating mode.

FIG. 8 shows a flow chart for illustrating a method for determining a wave form of the lamp current in accordance with one embodiment of this disclosure.

Since the initial conditions stipulated for the wave form depend on the color wheel 20 of the projection arrangement, e.g. on the number n of segments 20*a*, 20*b*, 20*c*, 20*d*, 20*e*, 20*f* of the color wheel 20 and their arrangement and size, and also on the rotational frequency of the color wheel 20, these items of information are predefined by the predefinition of a color wheel 20. 2× driving of the color wheel 20 will be assumed in this example. Furthermore, different commutation schemes 24 may be advantageous for different operating modes of the projection arrangement, which are characterized e.g. by different degrees of dimming, such as e.g. undimmed nominal operation P=100%, Eco operation at P=80%, dynamic dimming with a variable and dynamically adaptable degree of dimming e.g. from P=70% to P=30% or extreme dimming at approximately P=30%, etc. In this case, the example described here may be advantageous particularly in the case of less greatly dimmed operating modes.

In this case, a first step S10 involves providing a wave form having a commutation scheme 24 having an odd number k of commutations K within the time interval T. A commutation scheme 24 having an odd number k of commutations K has the advantage here that a DC component can be avoided more easily, as can be gathered from the illustrations in FIG. 6*a* and FIG. 6*b*. Furthermore, most of the lifetime data obtained empirically in recent years are based on these wave forms. Moreover, on average longer lifetimes of the discharge lamps can generally be achieved with such wave forms.

In this case, upon being provided, the commutation scheme 24 already has even further specific characteristics. By way of example, the wave form provided has a commutation scheme 24 coordinated with the predefined color wheel 20 in such a way that the polarity of the discharge lamp is commutated only during a transition region 22 between two color segments 20*a*, 20*b*, 20*c*, 20*d*, 20*e*, 20*f*. Furthermore, the commutation scheme 24 is configured such that it is repeated following a periodicity interval P, and furthermore such that during the periodicity interval P an electrode of the discharge lamp is in an anodic and cathodic phase for the same time during operation in accordance with this commutation scheme 24. Furthermore, in most cases lamp frequencies $f_L$ of $f_L$=60 Hz to $f_L$=150 Hz, i.e. 2 to 5 commutations K in the time interval T, have proved to be worthwhile for operation at nominal power and, therefore, are e.g. also intended furthermore to be used for this mode.

Providing the wave form in step S10 is followed, in step S12, by checking whether operation of the discharge lamp with the wave form provided in accordance with the commutation scheme 24 satisfies one criterion with regard to the lifetime of the discharge lamp.

If lifetime data exist that have already been obtained with respect to the given discharge lamp in combination with the commutation scheme 24 provided, then the checking of the criterion with regard to the lifetime in step S12 can be carried out in a simple manner by comparing the lifetime data already provided with a predefined limit value of the lifetime. In this case, the limit value firstly depends on the lamp type and secondly can also be predefined freely by a user, at least within a certain framework, such as e.g. by means of an average lifetime that is typical or characteristic of the lamp type.

If, for example, there are no lifetime data with respect to the lamp type with the corresponding commutation scheme 24, then in the course of checking the lifetime criterion it is also possible to estimate the expected lifetime, for example by operating the discharge lamp for a predefined period of time and documenting the aging process during this period of time, e.g. by measuring the current intensity of the lamp current during this period of time and extrapolating these measured values.

However, it is also possible to run through a complete lifetime cycle of the discharge lamp with the driving thereof in accordance with the commutation scheme 24 provided, which, although time-consuming, in return allows a very accurate ascertainment of the lifetime of this lamp type in the case of driving in accordance with the commutation scheme 24.

If this criterion with regard to the lifetime is not satisfied, then the commutation scheme 24 is changed in step S14 and the method begins anew in step S10 with providing the wave form having the new changed commutation scheme 24. In this case, changing the commutation scheme 24 can be carried out e.g. while maintaining the number k of commutations K of the commutation scheme 24 by means of a permutation of the commutations K and/or by means of changing the number k of commutations K, e.g. taking account of conditions mentioned above. If it is established in step S12 that the criterion with regard to the lifetime is satisfied, then the commutation scheme 24 is maintained and in step S16 operation of the discharge lamp is checked for a criterion with regard to a flicker amplitude.

For checking whether the criterion with regard to the flicker amplitude is satisfied, for a predefinable number of different degrees of dimming of the discharge lamp it is possible to ascertain in each case a flicker amplitude of a radiometric variable or preferably photometric variable, such as luminous flux, illuminance, luminance, light intensity, etc., or else the light signal as intensity of the light output by the projection arrangement during operation of the discharge lamp with the wave form. The criterion is satisfied here if the flicker amplitudes ascertained in each case in relation to an average value of the radiometric or photometric variable are less than or equal to a predefined limit value. This limit value can be gathered for example from a tabular or else graphical assignment, e.g. such as that illustrated in FIG. 4. By way of example, the limit value for a given flicker frequency f can be the relative critical flicker amplitude $A_{crit}$ assigned to this frequency f. In the case of 2× driving of the color wheel 20 and an odd number k of commutations K of the commutation scheme 24 in the time interval T, a flicker frequency f of 40 Hz, for example, results, as described with regard to FIG. 6*a* and FIG. 6*b*. The limit value of the relative flicker amplitude is therefore preferably approximately 1% to 1.5% in this example.

By measuring the flicker amplitude for different degrees of dimming, it is possible to simulate the behavior of the discharge lamp in the course of its lifetime. It is thereby possible to check and, in the case of the wave form ultimately provided at the ballast, to ensure that the projection arrangement does not exceed the relative critical flicker amplitude $A_{crit}$ in the course of the entire lifetime of the discharge lamp.

If this criterion is not satisfied for a wave form provided, then the commutation scheme 24 is again changed in step S14 and the method begins anew in step S10 with the commutation scheme 24 that has been changed again.

The order of steps S12 and S16 is arbitrary here, i.e. providing the wave form in step S10 can also be followed firstly by checking satisfaction of the criterion with regard to the flicker amplitude and, only if this criterion is satisfied by a commutation scheme 24, then checking satisfaction of the criterion with regard to the lifetime.

Moreover, it is possible to provide even further criteria in respect of which the operation of the discharge lamp or of the projection arrangement is checked. These optional further criteria are intended to be illustrated by step S18. By way of example, in step S12, the lifetime can be estimated and, if this estimation satisfies the criterion with regard to the lifetime, and in addition the criterion with regard to the flicker amplitude checked in step S16 is also satisfied, step S18 can involve checking more accurately the criterion with regard to the lifetime by running through the entire lifetime cycle. As a result, a very accurate statement about the lifetime can be made and time can nevertheless be saved since the checking in step S18 takes place only if a commutation scheme is present which satisfies the criterion with regard to the flicker amplitude and very probably likewise satisfies the criterion with regard to the lifetime as a result of the estimation in step S12.

By applying these criteria and taking account of at least the abovementioned conditions that are intended to be satisfied by the wave forms provided in step S10, within a small number of iteration steps it is possible to find a wave form which satisfies the criteria with regard to lifetime and flicker amplitude. Therefore, if the criteria checked in steps S12 and S16 and, if appropriate, S18 are satisfied for a commutation scheme 24, then in step S20 the wave form having this commutation scheme 24 is stored in a memory of the ballast. In this case, it is also possible for a plurality of wave forms determined according to this method to be stored for one operating mode of the projection arrangement or else one or a plurality of wave forms in each case to be stored for a plurality of operating modes characterized e.g. by different degrees of dimming, preferably only up to a maximum degree of dimming. During operation of the projection arrangement, depending on the operating mode, the ballast can access the corresponding wave form and operate the discharge lamp with a lamp current in accordance with this wave form.

Figure 9:
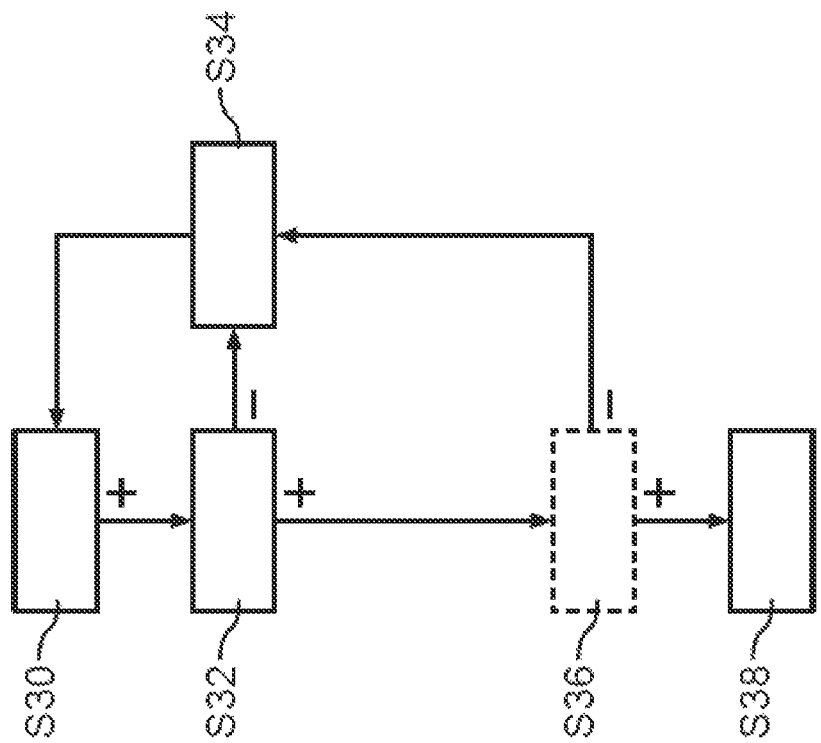
FIG. 9 shows a flow chart of a method for determining a wave form of a lamp current for operating a discharge lamp of a projection arrangement in a second operating mode.

FIG. 9 shows a flow chart of a method for determining a wave form for the operation of a discharge lamp in accordance with a further exemplary embodiment of this disclosure.

If the flicker amplitude assumes an excessively high value on account of extremely dimmed operation, then the initial use of a wave form with even commutation is recommended. This method is therefore preferably used for a very greatly dimmed operating mode of the projection arrangement. The method begins in step S30 with providing a wave form having a commutation scheme 24, but in this case having a commutation scheme 24 having an even number k of commutations K in the time interval T. For this wave form, too, as described above, further conditions can be stipulated, such as that the commutation scheme 24 is periodic and has no DC component, that in adaptation to the color wheel 20 during operation commutation is carried out only between two color segments 20a, 20b, 20c, 20d, 20e, 20f, that the number k of commutations K is preferably between 2 and 5, etc.

Providing the wave form is followed, in step S32, by checking whether operation of the discharge lamp in accordance with this commutation scheme 24 satisfies one criterion with regard to a lifetime. In this case, this checking can be carried out in the same way as described with regard to FIG. 8.

If this criterion is not satisfied, then step S34 involves changing the commutation scheme 24 of the wave form, e.g. once again by changing the permutation of the commutations K and/or by changing the number k of commutations K. The initial conditions of the wave form newly provided as a result, e.g. the even number k of commutations K within the time interval T, are still intended to be satisfied in this case. The method thereupon begins anew in step S30 with the wave form newly provided. This iteration is then carried out until the lifetime criterion is satisfied in step S32.

Further criteria can thereupon be checked in the optional step S36. By way of example, the checking in step S32 can again be configured such that only an estimation of the expected lifetime is carried out, which does not take up as much time as running through an entire lifetime cycle of the discharge lamp. It is only if a suitable wave form which satisfies this estimation criterion has been found that it is possible, in the optional step S36, by way of example, to carry out more accurate checking of the lifetime criterion by running through the entire lifetime cycle.

The step for measuring the flicker amplitude, such as in step S16 in the previous example, can be omitted in this case on account of the higher flicker frequency f, e.g. at 60 Hz, and the associated reduction of detectability. A possibly poorer lifetime performance of the wave forms with even commutation is then compensated for in dimmed lamp operation by the reduced loading of the electrodes.

Therefore, if the criterion checked in step S32 and, if appropriate, the criterion checked in step S34 are satisfied for a wave form, in step S38 the wave form is stored in a memory of the ballast as corresponding to a specific operating mode. In this case, too, it is again possible to store a plurality of wave forms for one or a plurality of different, e.g. dimmed, operating modes.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for determining a predefinable wave form of a lamp current for operating a discharge lamp of a projection arrangement in at least one first operating mode, wherein the projection arrangement has a predefined rotatable color wheel and the discharge lamp for illuminating the color wheel, wherein the discharge lamp has two electrodes, wherein the projection arrangement has a ballast for the discharge lamp, which ballast, during the operation of the projection arrangement, provides for the discharge lamp a lamp current embodied as alternating current and having the predefinable wave form, which has a predefinable commutation scheme, such that a polarity of the electrodes is commutated in accordance with the predefinable commutation scheme, the method comprising:

providing at least one first wave form having a first commutation scheme;

checking whether operation of the discharge lamp with a lamp current having the at least one first wave form satisfies one criterion of two criteria, wherein one of the two criteria relates to a lifetime of the discharge lamp and one of the two criteria relates to a flicker amplitude of the projection arrangement;

if the one criterion is satisfied, checking whether operation of the discharge lamp with a lamp current having the at least one first wave form satisfies a further criterion of the two criteria; and if at least the one criterion and the further criterion are satisfied, storing the at least one first wave form in a memory of the projection arrangement and providing the at least one first wave form as the predefinable wave form at the ballast for the discharge lamp.

2. The method of claim 1,
wherein if at least one of the two criteria is not satisfied, the first commutation scheme of the at least one first wave form is changed, and jumping to the providing at least one first wave form having a first commutation scheme.

3. The method of claim 1,
wherein for determining a predefinable second wave form of the lamp current for operating the discharge lamp of the projection arrangement in at least one second operating mode different than the first operating mode, at least the following is carried out:

providing at least one second wave form having a second commutation scheme, wherein the commutation scheme is configured in such a way that it has an even number of commutations in a predefined time interval, wherein the time interval is predefined by the color wheel rotating twice during the operation of the projection arrangement in this time interval in the second operating mode.

4. The method of claim 3, further comprising:
checking whether operation of the discharge lamp with a lamp current having the at least one second wave form satisfies a criterion which relates to a lifetime of the discharge lamp; and if at least the criterion is satisfied, storing the at least one second wave form in a memory of the projection arrangement and providing the at least one second wave form as the second predefinable wave form at the ballast for the discharge lamp.

5. The method of claim 4,
wherein if the criterion is not satisfied, the second commutation scheme of the at least one second wave form is changed, and jumping to the checking whether operation of the discharge lamp with a lamp current having the at least one second wave form satisfies a criterion which relates to a lifetime of the discharge lamp.

6. The method of claim 1,
wherein in the first operating mode the discharge lamp is operated in an undimmed fashion and/or up to a maximum degree of dimming.

7. The method of claim 3,
wherein in the second operating mode the discharge lamp is operated at least occasionally with more than a minimum degree of dimming.

8. The method of claim 1,
wherein the first commutation scheme in the providing at least one first wave form having a first commutation scheme is chosen such that it has an odd number of commutations in a time interval in which the color wheel rotates twice.

9. The method of claim 1,
wherein checking whether the criterion with regard to the lifetime is satisfied for the first and respectively second operating modes involves determining the expected lifetime of the discharge lamp during operation of the discharge lamp with a lamp current having the first and respectively second wave forms, wherein the criterion is satisfied if the lifetime determined is greater than or equal to a predefined limit value.

10. The method of claim 1,
checking whether the criterion with regard to the flicker amplitude is satisfied involves ascertaining, for a predefinable number of different degrees of dimming of the discharge lamp, in each case a flicker amplitude of a photometric variable of the light output by the projection arrangement during the operation of the discharge lamp with the first wave form, wherein the criterion is satisfied if the flicker amplitudes ascertained in each case in relation to an average value of the photometric variable are less than or equal to a predefined limit value.

11. The method of claim 1,
wherein the color wheel has a predefined number of color segments, and the projection arrangement is embodied in such a way that during the operation of the projection arrangement the discharge lamp illuminates a predefined region of the color wheel which is smaller than a respective color segment, wherein providing the first and respectively second wave forms having the first and respectively second commutation schemes involves choosing the first and respectively second commutation schemes in adaptation to a predefined rotation frequency of the color wheel during the operation of the projection arrangement in the first and respectively second operating modes and in adaptation to an arrangement and embodiment of the color segments of the color wheel such that during the operation of the projection arrangement in the first and respectively second operating modes a commutation of the lamp current takes place only if the predefined illuminated region is situated in a transition region between two color segments of the color wheel.

12. The method of claim 1,
wherein the commutation scheme in the providing at least one first wave form having a first commutation scheme is chosen such that it is temporally periodic with respect to a predefinable periodicity interval.

13. The method of claim 11,
wherein the commutation scheme in the providing at least one first wave form having a first commutation scheme is chosen such that, with respect to the periodicity interval, the electrodes of the discharge lamp, during the operation of the discharge lamp with a lamp current in accordance with the commutation scheme, are operated with a first polarity for the same time as with a second polarity, wherein as a result of a commutation a respective electrode of the discharge lamp changes from the first polarity to the second polarity, or vice versa.

14. A method for determining a predefinable wave form of a lamp current for operating a discharge lamp of a projection arrangement in at least one operating mode, wherein the projection arrangement has a predefined rotatable color wheel and the discharge lamp for illuminating the color wheel, wherein the discharge lamp has two electrodes, wherein the projection arrangement has a ballast for the discharge lamp, which ballast, during the operation of the projection arrangement, provides for the discharge lamp a lamp current embodied as alternating current and having the predefinable wave form, which has a predefinable commutation scheme, such that a polarity of the electrodes is commutated in accordance with the predefinable commutation scheme, the method comprising:

provided at least one wave form having a commutation scheme, wherein the commutation scheme is constituted in such a way that it has an even number of commutations in a predefined time interval, wherein the time interval is predefined by the color wheel rotating twice during the operation of the projection arrangement in this time interval;

checking whether operation of the discharge lamp with a lamp current having the at least one wave form satisfies a criterion which relates to a lifetime of the discharge lamp;

if at least the one criterion is satisfied, storing the at least one wave form in a memory of the projection arrangement, and providing the at least one wave form as the predefinable wave form at the ballast for the discharge lamp.

15. A projection arrangement comprising:
a predefined rotatable color wheel;
a discharge lamp for illuminating the color wheel, said discharge lamp having two electrodes;
wherein the projection arrangement has a ballast for the discharge lamp, which ballast is designed to provide, during the operation of the projection arrangement, for the discharge lamp a lamp current embodied as alternating current and having a predefined wave form, which has a predefined commutation scheme, such that a polarity of the electrodes is commutated in accordance with the predefined commutation scheme;

a memory, in which the predefined wave form is stored, wherein the predefined wave form stored in the memory is embodied in such a way that one criterion with regard to a lifetime of the discharge lamp and a further criterion with regard to a flicker amplitude of the discharge lamp are satisfied during operation of the discharge lamp with a lamp current having the predefined wave form.

16. A projection arrangement comprising:
a predefined rotatable color wheel;
a discharge lamp for illuminating the color wheel, said discharge lamp having two electrodes, wherein the projection arrangement has a ballast for the discharge lamp, which ballast is designed to provide, during the operation of the projection arrangement, for the discharge lamp a lamp current embodied as alternating current and having a predefined wave form, which has a predefined commutation scheme, such that a polarity of the electrodes is commutated in accordance with the predefined commutation scheme; and a memory, in which the predefined wave form is stored, wherein the predefined commutation scheme is constituted in such a way that it has an even number of commutations in a predefined time interval, wherein the time interval is predefined by the color wheel rotating twice during the operation of the projection arrangement in this time interval, wherein the predefined wave form stored in the memory is furthermore embodied in such a way that one criterion with regard to a lifetime of the discharge lamp is satisfied during operation of the discharge lamp with a lamp current having the predefined wave form.

* * * * *